G. E. STANLEY.
CLUTCH MECHANISM.
APPLICATION FILED NOV. 28, 1916.

1,254,372.

Patented Jan. 22, 1918.

Inventor:
George Enoch Stanley

UNITED STATES PATENT OFFICE.

GEORGE ENOCH STANLEY, OF COVENTRY, ENGLAND.

CLUTCH MECHANISM.

1,254,372.   Specification of Letters Patent.   Patented Jan. 22, 1918.

Application filed November 28, 1916. Serial No. 133,878.

*To all whom it may concern:*

Be it known that I, GEORGE ENOCH STANLEY, a subject of the King of Great Britain, and resident of Coventry, in the county of Warwick, England, have invented certain new and useful Improvements in Clutch Mechanism, of which the following is a specification.

My invention relates to clutch mechanism chiefly for use on motor cycles, and it has for its object to provide a combined construction embodying a resilient connection of the known type, having a traveling nut abutting against a spring, with a friction clutch, in such a way that the friction clutch may be employed for engagement in the usual manner and that the resilient connection can operate without the clutch necessarily slipping.

According to my invention, the clutch is engaged by a spring and this spring serves also as the spring of the resilient connection. That is to say it abuts against the traveling nut and its tension varies according to the pressure of the resilient connection. Thus the resilient connection can operate in the usual way without the clutch slipping.

The accompanying drawing shows one method of carrying out this invention.

Like letters indicate like parts throughout the drawing.

In the construction illustrated the shaft A is a counter-shaft and it passes into a gear box $A^2$, being supported by bearings therein which are omitted for the sake of clearness. At B is a chain sprocket which is connected by a chain with the engine. Between the sprocket B and the countershaft A are interposed a plate clutch at C and also a resilient connection between the clutch and the countershaft which will be more fully described later.

The driving plates of the clutch C engage splines $B^2$ on the interior of a shell $B^3$ which carries the sprocket and the driven plates are mounted upon a sleeve D, engaging splines or the like at $D^2$. The ring E constitutes the movable pressure plate of the clutch and is attached to the sprocket shell $B^3$, sliding upon the sleeve D. The plates abut against a flange $D^4$, and the sprocket shell $B^3$ and plate E move to the right to separate the plates but are normally forced to the left by a spring F. The latter acts through ball bearings $F^2$ upon a plate G which bears against the flange $B^4$ on the sprocket shell. The sleeve D is not however directly connected with the countershaft A but it is formed internally with splines H engaged by teeth $J^2$ on a nut J which screws upon a threaded bush K fixed to the countershaft A by a nut $A^{20}$.

It will be seen that the spring F bears at one end against a flange $J^3$ on the nut and against a bearing ring $F^3$ at the other end, which is free to slide upon the surface $K^2$.

Figure 1:
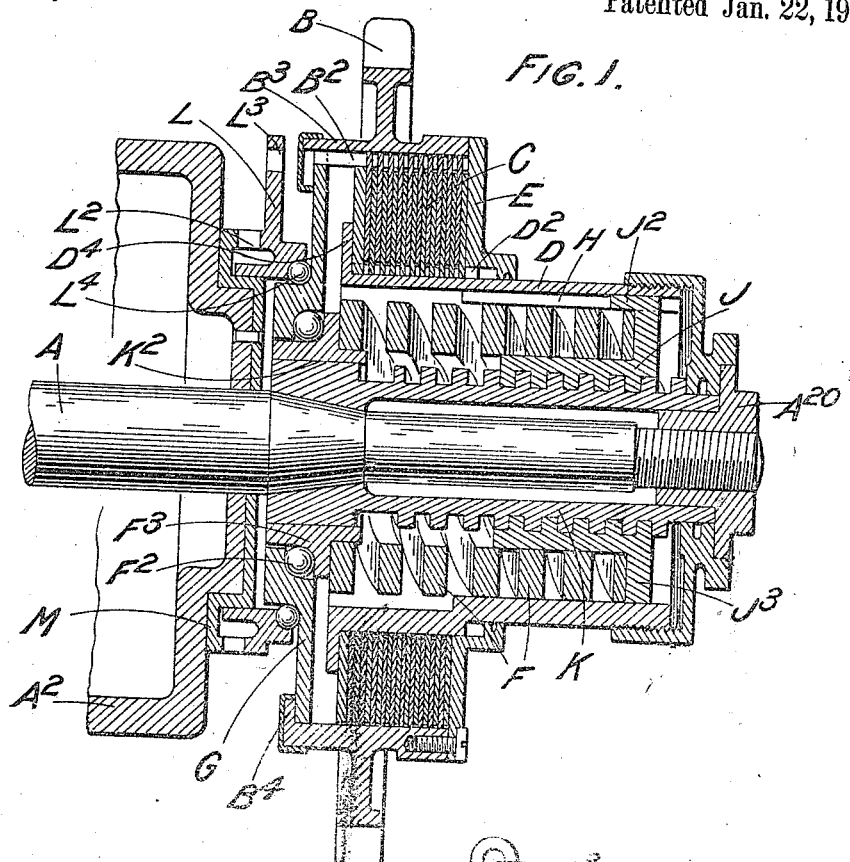
Figure 1 is a longitudinal section through mechanism attached to the end of a counter shaft interposed between the engine and rear wheel of a motor cycle.
Figure 2:
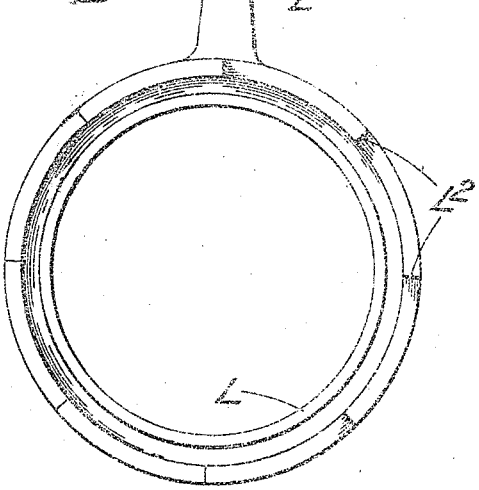
Fig. 2 is a face view of the clutch-operating device.

The spring F is normally under compression causing the clutch plates to engage one another resulting in the sprocket B being normally clutched to the sleeve D. The connection between the latter D and the countershaft is resilient, as described. That is to say, under load the nut J tends to rotate on the threaded bush K and in so doing it screws to the left in Fig. 1 until the increased resistance of the spring prevents further axial movement and the sleeve, nut, screwed bush and countershaft revolve together after the shock has been resiliently absorbed. As the nut moves to the left the spring pressure increases and the pressure on the clutch plates is augmented. When the parts are at rest the spring is under sufficient compression to hold the clutch plates in engagement. Under light loads the clutch engagement is gentle, but as the load increases the clutch engagement increases and the desired result is obtained.

To disengage the clutch plates there may be employed a disengaging ring L formed with beveled cam surfaces or inclines $L^2$ which engage corresponding surfaces on a ring M fixed to the wall of the gear box. By moving the lever $L^3$ the beveled surfaces $L^2$ force the disengaging ring L to the right in Fig. 1 and this, through the ball race $L^4$, pushes the plate G and the sprocket shell $B^3$ to the right causing the plates to separate.

What I claim as my invention, and desire to secure by Letters Patent, is:—

1. In a clutch mechanism, the combination of a driving shaft, a sleeve around said shaft, a screw thread on said shaft, a nut engaging said thread, a sliding driving connection between said nut and said sleeve, a shell around said sleeve, a friction clutch between said sleeve and said shell, a movable member attached to said shell, a spring between said movable member and said nut, and means for moving said member endwise, substantially as set forth.

2. In a clutch mechanism, the combination of a driving shaft, a bush attached thereto, a screw thread on said bush, a sleeve around said shaft, a nut engaging said thread, a sliding driving connection between said nut and said sleeve, a shell around said sleeve, a friction clutch between said sleeve and said shell, a movable member attached to said shell, a spring between said movable member and said nut, a disengaging ring bearing against said member, inclines on said ring, and fixed inclines engaged thereby, substantially as set forth.

In testimony whereof I have signed my name to this specification in the presence of two subscribing witnesses.

GEORGE ENOCH STANLEY.

Witnesses:
 ERIC W. WALFORD,
 J. FAZAKARBY.